United States Patent

Sano

[11] Patent Number: 5,278,399
[45] Date of Patent: Jan. 11, 1994

[54] DATA ENTRY UNIT

[75] Inventor: Shigeaki Sano, Fuchu, Japan

[73] Assignee: Toppan Moore Company, Ltd., Tokyo, Japan

[21] Appl. No.: 857,130

[22] Filed: Mar. 25, 1992

Related U.S. Application Data

[63] Continuation of Ser. No. 499,620, Mar. 26, 1990, abandoned.

[30] Foreign Application Priority Data

Mar. 28, 1989 [JP] Japan ................... 1-76019

[51] Int. Cl.$^5$ ............... G06K 7/10; G06K 9/00; G08C 21/00
[52] U.S. Cl. .................... 235/472; 178/18; 382/3
[58] Field of Search ............ 382/3, 59; 178/18; 235/472, 375, 383, 385, 462

[56] References Cited

U.S. PATENT DOCUMENTS

| | | | |
|---|---|---|---|
| 4,251,798 | 2/1981 | Swartz et al. | 235/472 |
| 4,569,421 | 2/1986 | Sandstedt | 235/383 |
| 4,628,193 | 12/1986 | Blum | 235/375 |
| 4,672,677 | 6/1987 | Yamakawa | 178/18 |
| 4,752,965 | 6/1988 | Dunkley et al. | 235/379 |
| 4,820,887 | 4/1989 | Schmitz | 200/43.18 |
| 4,850,004 | 7/1989 | Zook et al. | 235/375 |
| 4,856,077 | 8/1989 | Rothfjell | 235/472 |
| 4,875,036 | 10/1989 | Washizuka et al. | 178/18 |
| 4,916,441 | 4/1990 | Gombrich | 235/382 |
| 4,918,723 | 4/1990 | Iggulden et al. | 379/100 |
| 4,983,818 | 1/1991 | Knowles | 235/472 |
| 5,123,064 | 6/1992 | Hacker et al. | 382/3 |

FOREIGN PATENT DOCUMENTS

| | | |
|---|---|---|
| 60-51928 | 8/1983 | Japan . |
| 61-43332 | 8/1984 | Japan . |
| 62-139027 | 12/1985 | Japan . |
| 63-156538 | 3/1987 | Japan . |

Primary Examiner—Eugene R. LaRoche
Assistant Examiner—Christopher Glembocki
Attorney, Agent, or Firm—Kenyon & Kenyon

[57] ABSTRACT

A data entry unit includes a bar code reader. The composition of the data entry unit consists of an entry face on which a main entry portion such as a keyboard is disposed and a bar code reader disposed on the bottom face of the entry unit. The bar code data are read by having the bottom face of the data entry unit adhere closely to the bar code.

4 Claims, 4 Drawing Sheets

DATA ENTRY UNIT

This application is a continuation of application Ser. No. 07/499,620, filed on Mar. 26, 1990 abandoned.

BACKGROUND OF THE INVENTION

The present invention relates to a data entry unit such as a handy terminal.

With the advance of communication techniques, small-sized and portable type terminals and data entry units have come into general use. By means of computer systems, computers have been brought into use for inventory control of commodities, goods control operation in package delivery business and route sales and so forth, where data entry units in which a plurality of input data are stored temporarily and transmitted to a host computer collectively thereafter by means of a communication apparatus are being employed.

A keyboard is in general use as data entry means of a data entry unit of this type, but a bar code reader has also come into general use recently due to the spread of bar codes. A pen type in which the bar code is read by manually scanning is commonly used as a bar code reader provided on a portable data entry unit.

In the case of a pen type bar code reader such as used in a conventional example, however, a read scanning portion of the bar code reader is connected to the data entry unit body through a flexible cable, thus causing such a problem that a trouble of breakage of said cable is liable to occur while the data entry unit is carried.

In addition, there is such a defect that, since read scanning is performed manually a decoder circuit which interprets read signals becomes complicated because a circuit which copes with read scanning speed variation is required and so forth. As a result the circuit in the data entry unit body becomes large in size.

SUMMARY OF THE INVENTION

The present invention provides a data entry unit provided with a bar code read function which does not get in the way of carrying and can perform decoding process of read signals in a simple manner.

A data entry unit according to the present invention comprises a window for reading a bar code by means of a bar code reader which is provided on a bottom face of the entry unit.

A bar code printed face adheres closely to the bottom face of the unit at the time of reading the bar code. Accordingly, levels of a white signal and a black signal which are input to a photoelectric conversion unit of the bar code read means are stabilized. As a result, the decoder circuit for bar code reading can be simplified and the unit does not become large in size even if the decoder circuit is incorporated in the data entry unit. Moreover, since the bar code read means are incorporated in one body, a problem of broken cable will not occur and carrying the unit also becomes easier.

DETAILED DESCRIPTION

Preferred embodiments of the present invention will be described hereafter with reference to the drawings.

Figure 2:
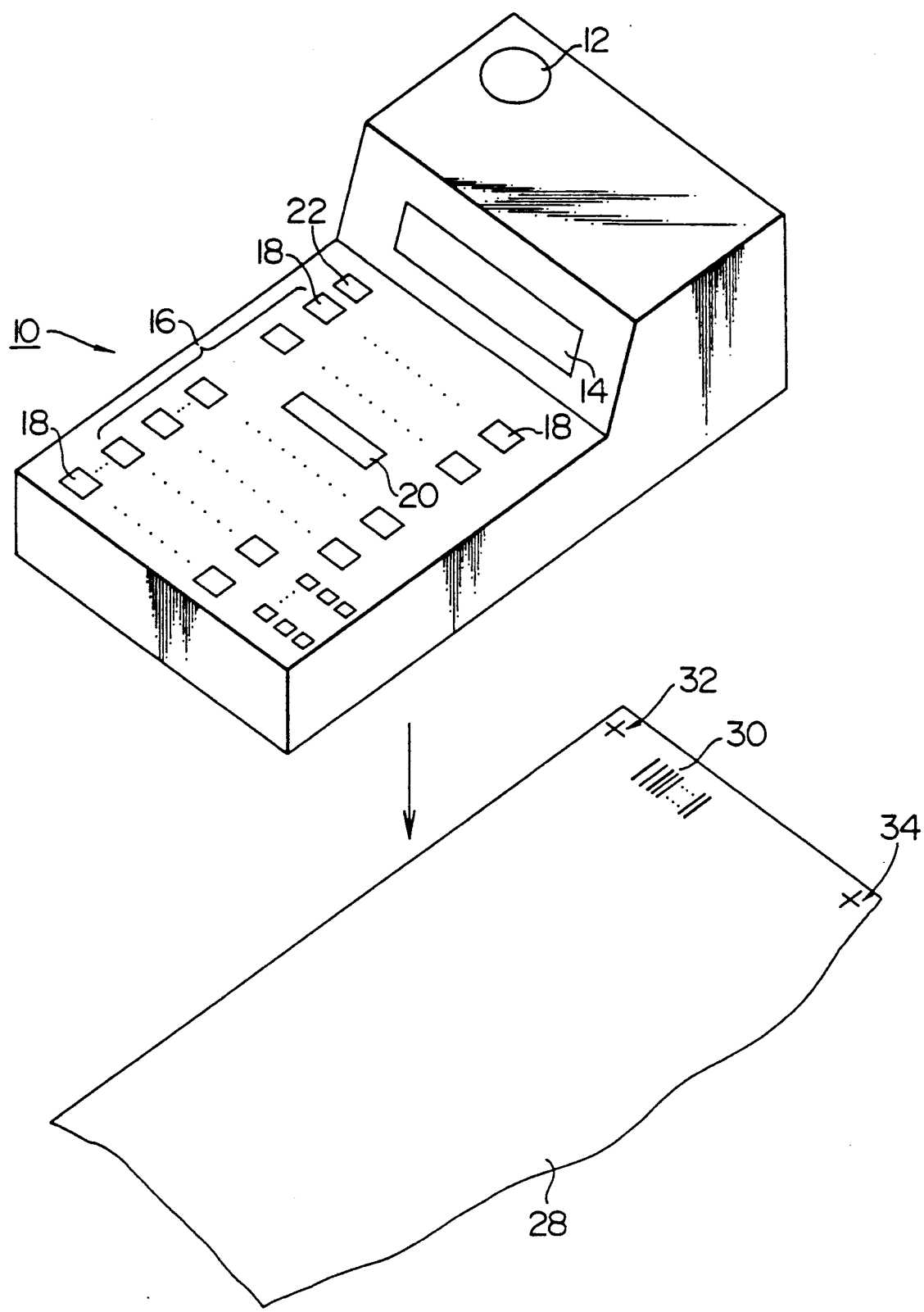
FIG. 2 is an exterior view of the embodiment shown in FIG. 1.

FIG. 2 shows an exterior perspective view of a hand held terminal which is an embodiment of a data entry unit including the present invention. In FIG. 2, a reference numeral 10 denotes a handy terminal having a rechargable battery (not shown) as a power source. 12 denotes an acoustic coupler, 14 denotes an LCD display unit, and 16 denotes a flat type keyboard such as a membrane switch which is provided with a pad 20 for entering handwritten graphics in addition to a plurality of key switches 18. 22 denotes a power source switch.

The flat type keyboard 16 outputs a signal showing a brush pressure position when a pressure with a pen, etc. is applied onto the keyboard surface. Those constructions that have been disclosed in Japanese patent application Laid-Open No. JP-A-60-51928, Japanese patent application Laid-Open No. JP-A-61-43332, Japanese patent application Laid-Open No. JP-A-62-139027, and so forth can be utilized for the construction itself. There are assigned on the surface of the keyboard 16 key switches 18 such as key switches showing certain work contents, alphabet (or Japanese Kana characters) keys for entering general data and numerical keys (so-called ten keys) and a pad 20 for entering handwritten graphics. Some of those key switches that show the work contents of the key switches 18 designate various items such as:

| Departure | Arrival |
|---|---|
| Goods delivery | Goods reception |
| Recess start | Recess termination |
| Refueling | Refueling complete |
| Traffic jam | Traffic jam dissolved |
| Delivered goods No. | |
| Delivery location (front door, back door, caretaker, and next door, etc.) | |

Figure 3:
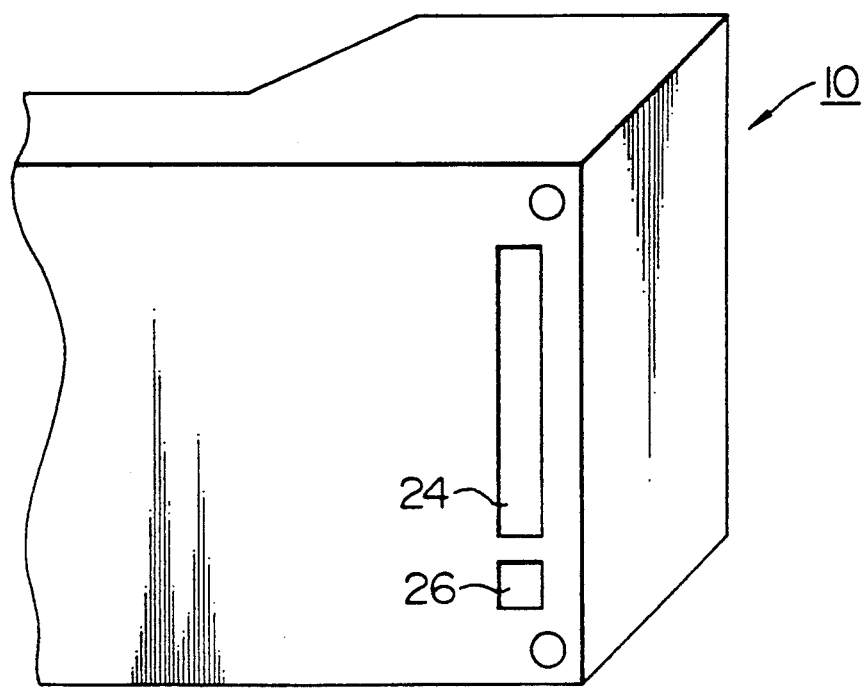
FIG. 3 is a perspective view showing the bottom face of the unit shown in FIG. 2.

FIG. 3 is a perspective view showing the bottom face of the handy terminal 10 which is an embodiment of a data entry unit according to the present invention. There is a glass window 24, for reading a bar code, in parallel with the rear end face at the end of the bottom face, and there is also provided an optical window 26 for optical communication adjacent to the glass window 24.

In FIG. 2, 28 denotes a slip on which a bar code 30 is printed at a predetermined position. It is preferred that the printing position of the bar code 30 on the slip 28 is determined in advance. However, it may also be arranged, for example, that marks 32 and 34 which show references for positioning may be printed in advance on the surface of the slip 28, or the bar code 30 may be printed at such a position that the bar code 30 appears under the read window 24 when the end portion of the unit 10 is positioned at a predetermined end portion of the slip 28.

It is possible to supply power from the exterior to a secondary battery of the handy terminal 10 shown by means of magnetic coupling. Therefore, no external connecting terminal for power supply is provided on the handy terminal 10. That which is described in detail in Japanese Utility Model Application No. 48265, 1987 (JP-U-63-156538), may be utilized for the power supply system by means of magnetic coupling. In the present embodiment, data transfer to and from the exterior is performed by means of optical communication through the acoustic coupler 12 or the optical window 26. Therefore, the handy terminal 10 shown is provided with no electrical terminal for external connection, thus forming an enclosed construction.

Figure 4:
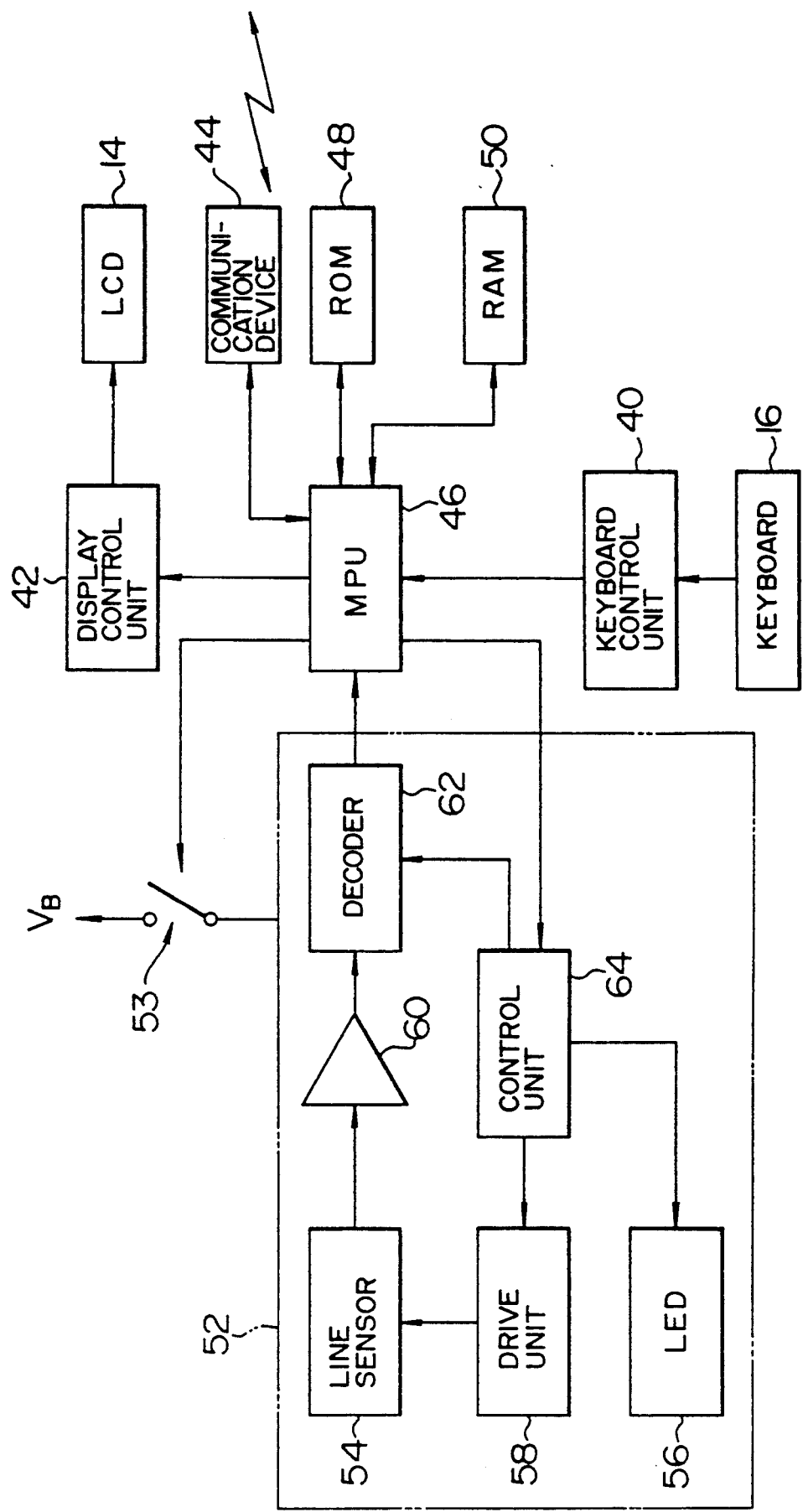
FIG. 4 is a block diagram of the electric circuit system of FIG. 2.

FIG. 4 shows a circuit block diagram of the unit 10 shown in FIG. 2. 40 denotes a keyboard control circuit which controls the keyboard 16 of FIG. 2 and outputs entered data after processing these data in a predetermined format, 42 denotes a display control circuit which controls an LCD display unit 14, 44 denotes a communication unit consisting of a modulator-demodulator (modem), an acoustic coupler 12 and an optical coupler (not shown), 46 denotes a main control circuit which consists of a microcomputer and controls the whole unit generally, 48 denotes a read-only memory (ROM), 50 denotes a random access memory (RAM), and 52 denotes a bar code reader. Besides, 53 denotes a switch for connecting power source to the bar code reader 52.

In the ROM 48, an operation program and required data for the main control circuit 46 are stored, and in the RAM 50, entered data from the keyboard 16 and those data that have been read by the bar code reader 52 are stored in addition to temporary variables and communication data for the control of respective parts.

The bar code reader 52 is provided with a lighting system, LED 56, illuminating the bar code 30 to be read and a line sensor 54 which receives reflected light from the bar code 30. The lighting system 56 has such a structure that a plurality of light emitting diodes are arranged in a line and a cylindrical lens is arranged in the front thereof. The line sensor 54 outputs photoelectric conversion signals in order under the drive clock of a drive circuit 58. The output of the line sensor 54 is amplified by a preamplifier 60 and decoded by a decoder 62. The decoder 62 outputs a code signal which corresponds to the bar code which has been read. A control circuit 64 controls the whole of the bar code reader 52, and brings the bar code reader 52 under operational state in accordance with the indication from the main control circuit 46.

Figure 1:
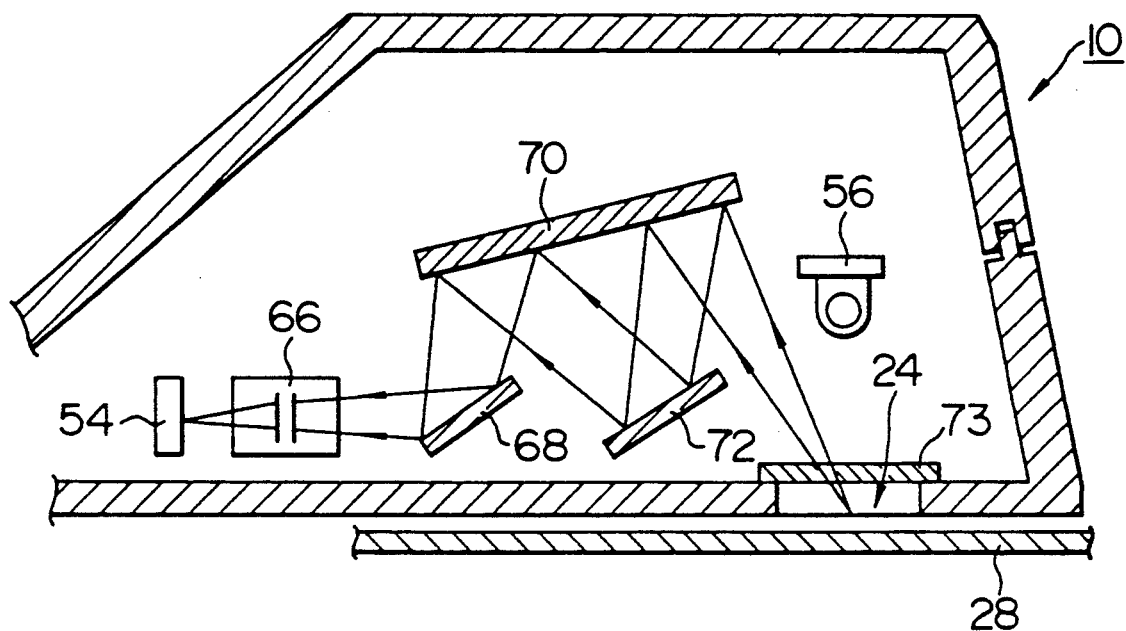
FIG. 1 is a sectional view showing an embodiment of a data entry unit according to the present invention.
Figure 5:
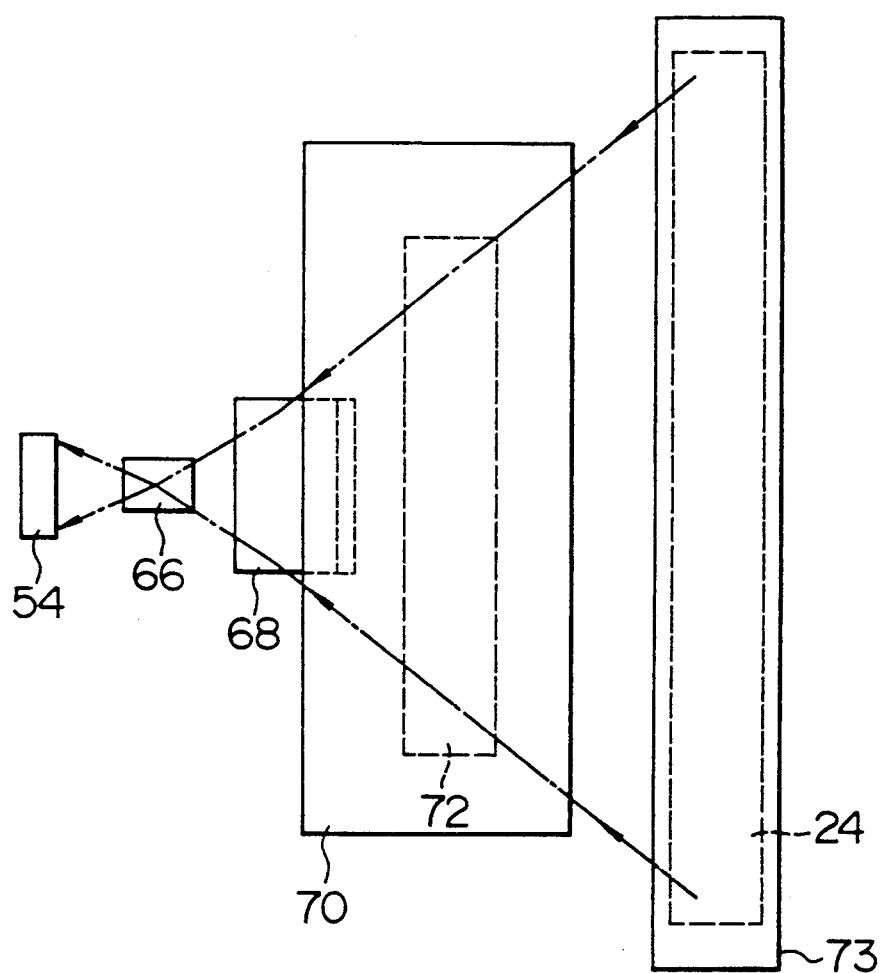
FIG. 5 is a plan view of the optical system of FIG. 1.

FIG. 1 shows a side view of an optical system of the present embodiment, and FIG. 5 shows a plan view thereof. The lighting system 56 is disposed right above the read window 24. The reflected light from the bar code located under the read window 24 is reflected by reflecting mirrors 70, 72 and 68, and is incident to the photoelectric conversion surface of the line sensor 54 by an imaging lens 66. 73 denotes transparent glass which encloses the read window 24.

The operation of the present embodiment will now be described with emphasis on the operation of the bar code reader 52.

When it is desired to read a bar code of the slip with the handy terminal 10, the following steps are taken. That is, the unit 10 is placed on the slip 28 with marks 32 and 34, etc. as reference points so that the bar code 30 of the slip 28 is positioned right under the read window 24. Then, the operator indicates to read the bar code by means of predetermined switch operation of the keyboard 16. The main control circuit 46 closes the switch 53 so as to connect the power source to the bar code reader 52 in accordance with these indications, and indicates to the control circuit 64 thereof to read the bar code.

In the bar code reader 52, the control circuit 64 lights the lighting system 56 first and brings the drive circuit 58 and the decoder 62 into the operating state. The output light of the lighting system 56 illuminates the whole surface of the read window 24. With this, the bar code 30 which adheres closely right under the read window 24 is illuminated. Since the printed face of the bar code 30 adheres closely to the bottom face of the unit 10 and no lighting by external light is applied, the quantity of light of the light emitting diode 56 may be comparatively small as compared with the illuminating quantity of light in the case of a conventional pen type bar code reader. The light reflected by the bar code 30 is incident to the line sensor 54 through the read window 24, reflecting mirrors 70, 72 and 68 and the imaging lens 66.

The line sensor 54 converts the black and white pattern signal of the bar code 30 into an electrical signal, and the electrical signal is read from the line sensor 54 in accordance with the drive clock from the drive circuit 58. The output of the line sensor 54 is amplified by the preamplifier 60 and applied to the decoder 62. The decoder 62 applies the code signal corresponding to the bar code which has been read to the main control circuit 46.

The main control circuit 46 indicates read termination to the control circuit 64 when it receives the bar code read data from the bar code reader 52. The control circuit 64 brings respective circuits into a non-operating state in accordance with this indication of read termination. For example, light emission of the lighting system 56 is suspended. When respective parts of the bar code reader 52 are brought into a non-operating state in a normal manner, the control circuit 64 informs the main control circuit 46 to that effect. The main control circuit 46 releases the switch 53 in accordance with the above. The main control circuit 46 may release the switch 53 immediately after receiving the bar code read data when no bad influence is exerted upon respective circuits of the bar code reader 52 even if the power source of the bar code reader 52 is interrupted suddenly.

The main control circuit 46 stores the bar code read data in the RAM 50. In the RAM 50, data from the keyboard 16 are also stored, and those stored data of the RAM 50 are read at a delivery center and the like, and transmitted to a host computer (not shown) through the communication unit 44.

Besides, as described previously, the key switches 18 of the flat type keyboard 16 include key switches showing certain work contents, alphabet (or Japanese Kana characters) keys for entering general data, numerical keys (so-called ten keys) and so forth, and when more than predetermined brush pressure is sensed with any of the key switches 18, the keyboard control circuit 40 creates a code corresponding to the contents of above-said sensing. When a signature is affixed to the pad 20 for entering handwritten graphics, the key switch which indicates signature input is pushed first. Then, the keyboard control circuit 40 reads a signal from the portion of the pad 20 for entering handwritten graphics, for example, a signature pattern which is affixed. It is judged that the signature has been completed by means of key operation of signature termination, thereby to terminate graphic pattern read at the portion of the pad 20 for entering handwritten graphics. The keyboard control circuit 40 sends these entered data from the key switches 18 and entered data from the pad 20 for entering handwritten graphics to the main control circuit 46 with a predetermined format, and the main control circuit 46 stores those entered data in the RAM 50.

When a code of entry cancel is received from the keyboard control circuit 40, the main control circuit 46 clears entered data which have been in a lump so far and waits for new keyboard entry or bar code entry as a matter of course. To clarify the lump of entered data, it is only required to enter termination of a series of data entry to the main control circuit 46 through the keyboard control circuit 40 by means of, for example, operation of a return key or an enter key.

A user of the handy terminal 10 transmits those data that are stored in the RAM 50 to the host computer by the communication unit 44 (to be concrete, an optical communication unit of optical coupler system) when he returns to the office, the delivery center and the like. With this, it is possible for the host computer to acquire detailed work contents information from the operator together with time information thereof.

Although a power source system is omitted in FIG. 1, the RAM 50 is backed up with a battery as a matter of course so that entered data will not be lost even when the power source of the unit 10 is disconnected. It may also be arranged in such a manner that battery backed-up another memory, a non-volatile memory, a magnetic recording medium and the like are prepared without battery back-up of the RAM 50 itself, and the stored data of the RAM 50 take refuge in them when the power source of the unit 10 is disconnected or prior thereto.

Since the bar code read window 24 is provided on the bottom face of the unit in the present embodiment, the bar code printed face of the slip and others adheres closely to the bottom face of said unit. Accordingly, no excessive external light is incident to the line sensor 54. As a result, only a small quantity of emission light of the lighting system 56 is required, it becomes easier to discriminate between the black level and the white level with the decoder 62, and the circuit composition may also be simplified. Since there are not a few opportunities of invasion of external light in a conventional pen type reader and the like, it has been required to provide a black level and white level discriminator or a level adjustment circuit in which consideration is given to invasion of external light. However, it is not required at all in the present embodiment.

Although a handy terminal has been described as an example so far, it is apparent that the present invention may also be applied to a data entry unit in which entered data are stored and data transfer is performed with a form of a memory card and the like. The bar code read window 24 is disposed at the upper end portion of the bottom face in the embodiment shown, however, it may also be disposed at a different location of the bottom face, for example, at the side end portion thereof.

As it may be easily understood from the above description, levels of the white signal and the black signal that are input to photoelectric conversion means are stabilized according to the present invention. Accordingly, the decoder circuit for the bar code may be simplified, thus preventing the unit from becoming large in size even if the decoder circuit is incorporated in the data entry unit. Furthermore, with the bar code read means being incorporated in one body, no problem of broken cable will occur and it becomes easier to carry the unit.

What is claimed is:

1. A portable data entry unit for taking or recording of information about packages and delivery thereof to customers, comprising:
    a main data entry device adapted to input information about the packages and delivery thereof;
    an information display;
    a bar code reader adapted to read a bar code disposed on a package surface, where a bar code represents information about the associated package and delivery thereof;
    a transparent window through which an optical image of a bar code passes to said bar code reader;
    a control unit controlling input and output of information among said main data entry device, said bar code reader and said display; and
    a memory storing and reading out the information;
    wherein said main data entry device and said information display are disposed on a same surface at the top of the data entry unit;
    wherein said transparent window is flat and is provided on a bottom surface that is opposite to said same surface at the top of the data entry unit, said transparent window being in contact with the bar code when said bottom surface is placed on the package surface;
    wherein said main data entry device includes a keyboard and a signature input pad on which a handwritten signature of the customer as an acknowledgement is entered with a stylus, the entered customer's hand-written signature being converted into signature information data in digital form by said control unit and said signature information data being stored in said memory.

2. A data entry unit according to claim 1 wherein said bar code reader includes an optical system which leads said optical image into said data entry unit, and a photoelectric conversion unit which converts said optical image obtained through said optical system into an electrical signal.

3. A data entry unit according to claim 2, wherein said main data entry means include a keyboard.

4. A data entry unit according to claim 3, wherein said keyboard includes a membrane switch.

* * * * *